US008699432B2

(12) United States Patent
Sinivaara et al.

(10) Patent No.: US 8,699,432 B2
(45) Date of Patent: Apr. 15, 2014

(54) ARRANGEMENT AND METHOD FOR CONNECTING AN AD-HOC COMMUNICATION NETWORK TO A PERMANENT COMMUNICATION NETWORK VIA A HALF-DUPLEX COMMUNICATION LINK

(75) Inventors: Hasse Sinivaara, San Jose, CA (US); Pasi Auranen, Salo (FI)

(73) Assignee: Savox Communications Oy Ab (Ltd), Espoo (FI)

( * ) Notice: Subject to any disclaimer, the term of this patent is extended or adjusted under 35 U.S.C. 154(b) by 266 days.

(21) Appl. No.: 12/863,447

(22) PCT Filed: Jan. 22, 2008

(86) PCT No.: PCT/FI2008/000012
§ 371 (c)(1),
(2), (4) Date: Oct. 5, 2010

(87) PCT Pub. No.: WO2009/092842
PCT Pub. Date: Jul. 30, 2009

(65) Prior Publication Data
US 2011/0026477 A1    Feb. 3, 2011

(51) Int. Cl.
*H04W 4/00* (2009.01)
(52) U.S. Cl.
USPC .......................................... 370/329; 370/338
(58) Field of Classification Search
None
See application file for complete search history.

(56) References Cited

U.S. PATENT DOCUMENTS

| | | | | |
|---|---|---|---|---|
| 5,159,592 A | * | 10/1992 | Perkins | 370/338 |
| 5,680,552 A | * | 10/1997 | Netravali et al. | 709/250 |
| 5,852,723 A | * | 12/1998 | Kalkunte et al. | 709/235 |
| 6,121,881 A | * | 9/2000 | Bieback et al. | 340/573.1 |
| 6,791,997 B2 | * | 9/2004 | Beyer et al. | 370/447 |
| 7,031,309 B1 | * | 4/2006 | Sautter et al. | 370/392 |
| 7,127,265 B2 | * | 10/2006 | Kantola | 455/518 |
| 7,221,659 B1 | * | 5/2007 | Surazski et al. | 370/286 |
| 7,392,318 B1 | * | 6/2008 | Rai | 709/230 |
| 7,643,817 B2 | * | 1/2010 | Klug et al. | 455/411 |

(Continued)

FOREIGN PATENT DOCUMENTS

| | | |
|---|---|---|
| EP | 0 644 702 A1 | 3/1995 |
| WO | 2006035366 A1 | 4/2006 |
| WO | 2006/136992 A2 | 12/2006 |

OTHER PUBLICATIONS

European Search Report, dated Sep. 28, 2011, in EP 08701699.

(Continued)

*Primary Examiner* — Bunjob Jaroenchonwanit
(74) *Attorney, Agent, or Firm* — Young & Thompson

(57) ABSTRACT

A method and arrangement for connecting an ad-hoc communication network (101) to a permanent communication network (102) via a half-duplex communication link (140). The ad-hoc communication network is established between communication devices (103-106) and a gateway device (107) using a routing protocol that is run in the gateway device and in the communication devices. Relaying of data between the ad-hoc communication network and the permanent communication network is controlled by setting the following relaying operations into a pre-determined order of mutual priority: relaying data from the ad-hoc communication network to the permanent communication network and relaying data from the permanent communication network to the ad-hoc communication network. The pre-determined order of priority facilitates data transfer via the half-duplex communication link between the permanent communication network and the ad-hoc communication network that can be either a full-duplex network or a half-duplex network.

40 Claims, 9 Drawing Sheets

(56) References Cited

U.S. PATENT DOCUMENTS

| | | | |
|---|---|---|---|
| 7,787,896 B2* | 8/2010 | Kundu et al. | 455/518 |
| 7,983,199 B1* | 7/2011 | Nguyen et al. | 370/260 |
| 2002/0129120 A1* | 9/2002 | Tseng | 709/218 |
| 2003/0123466 A1* | 7/2003 | Somekh et al. | 370/401 |
| 2003/0224784 A1* | 12/2003 | Hunt et al. | 455/426.2 |
| 2003/0224825 A1* | 12/2003 | Cox et al. | 455/560 |
| 2004/0100929 A1* | 5/2004 | Garcia-Luna-Aceves | 370/338 |
| 2004/0133620 A1* | 7/2004 | Habetha | 709/200 |
| 2004/0176077 A1* | 9/2004 | Loveland | 455/414.1 |
| 2004/0213180 A1* | 10/2004 | Cho et al. | 370/329 |
| 2004/0215812 A1* | 10/2004 | Lu | 709/233 |
| 2005/0013426 A1* | 1/2005 | Ooki | 379/211.02 |
| 2005/0144485 A1 | 6/2005 | Mousseau | |
| 2005/0249245 A1* | 11/2005 | Hazani et al. | 370/485 |
| 2006/0073843 A1 | 4/2006 | Aerrabotu et al. | |
| 2006/0083197 A1* | 4/2006 | Kang | 370/329 |
| 2006/0104232 A1* | 5/2006 | Gidwani | 370/328 |
| 2006/0104333 A1* | 5/2006 | Rainbolt et al. | 375/132 |
| 2006/0183460 A1* | 8/2006 | Srinivasan et al. | 455/410 |
| 2006/0198324 A1* | 9/2006 | Nerses et al. | 370/260 |
| 2006/0267936 A1* | 11/2006 | Hoerl et al. | 345/158 |
| 2007/0076698 A1* | 4/2007 | Matsumoto | 370/352 |
| 2007/0097993 A1* | 5/2007 | Bojahra et al. | 370/401 |
| 2007/0104121 A1 | 5/2007 | Shaffer et al. | |
| 2007/0115827 A1* | 5/2007 | Boehnke et al. | 370/236 |
| 2007/0133504 A1* | 6/2007 | Shin et al. | 370/351 |
| 2007/0160192 A1 | 7/2007 | Horio et al. | |
| 2007/0173202 A1* | 7/2007 | Binder et al. | 455/68 |
| 2007/0208807 A1* | 9/2007 | Jagannathan et al. | 709/204 |
| 2007/0217433 A1* | 9/2007 | Doppler et al. | 370/400 |
| 2007/0225044 A1* | 9/2007 | Law et al. | 455/562.1 |
| 2007/0232258 A1* | 10/2007 | Matsumoto et al. | 455/404.1 |
| 2008/0057893 A1* | 3/2008 | Patla | 455/187.1 |
| 2008/0153443 A1* | 6/2008 | Takusagawa et al. | 455/187.1 |
| 2008/0188181 A1* | 8/2008 | Choi et al. | 455/41.2 |
| 2008/0207177 A1* | 8/2008 | Shukla | 455/413 |
| 2008/0279163 A1* | 11/2008 | Desai | 370/338 |
| 2008/0317104 A1* | 12/2008 | Akcaba et al. | 375/211 |
| 2009/0103501 A1* | 4/2009 | Farrag et al. | 370/337 |
| 2009/0132718 A1* | 5/2009 | Groll et al. | 709/229 |
| 2009/0180451 A1* | 7/2009 | Alpert et al. | 370/338 |
| 2010/0016745 A1* | 1/2010 | Crump et al. | 600/519 |
| 2010/0165924 A1* | 7/2010 | Olivier et al. | 370/328 |
| 2010/0260193 A1* | 10/2010 | Ulybin | 370/401 |
| 2011/0085475 A1* | 4/2011 | Sinivaara et al. | 370/277 |
| 2012/0106419 A1* | 5/2012 | Gonikberg et al. | 370/311 |
| 2012/0113901 A1* | 5/2012 | Jackson et al. | 370/328 |

OTHER PUBLICATIONS

International Search Report, dated Oct. 17, 2008, from corresponding PCT application.

* cited by examiner

ARRANGEMENT AND METHOD FOR CONNECTING AN AD-HOC COMMUNICATION NETWORK TO A PERMANENT COMMUNICATION NETWORK VIA A HALF-DUPLEX COMMUNICATION LINK

FIELD OF THE INVENTION

The invention relates generally to a method and arrangement for connecting an ad-hoc communication network to a permanent communication network via a half-duplex communication link. The invention further relates to a gateway device capable of connecting an ad-hoc communication network to a permanent communication network via a half-duplex communication link.

BACKGROUND

Portable equipment, e.g. a handheld device or a wearable device such as a breathing mask, can be equipped with or connected to a communication device in order to enable the wearer of the equipment to communicate with other persons. The communication device comprises typically a microphone and an audio amplifier and/or a radio transceiver; additionally the communication device may comprise a display unit. For example, a fire fighter wearing a breathing mask has to be able to communicate with other fire fighters and with fire chiefs and/or images and videos may be broadcasted between communication devices. Typically communication can be voice, data, and/or image/video communication. Additionally, data can be digitally packetized audio, video and/or image. Members of an operational team such as fire fighters constitute an ad-hoc communication group within which all the members have to be able to communicate with all other members of the operational team. The members of the operational team may use, for example, short range radio transceivers for communication within the operational team. Furthermore, a member of an operational team has to be able to communicate with persons outside the operational team. For example, a fire fighter may have a need to communicate with personnel located outside incident or operating area. Generally, the said personnel can be situated so far from the place in which the fire fighters are operating that usually a permanent, not an ad-hoc, communication network is needed for providing communication connections between the fire fighters and the personnel outside incident or operating area. The permanent communication network can be, for example, a mobile communication network or a landline network.

Publication WO2006136992 discloses a method and apparatus for establishing a virtual ad-hoc network. First, under the assistance of a cellular mobile communication network, a plurality of point-to-point enabled communication devices performs multicast connectivity testing. Then, a group of communication devices that can communicate directly with each other are determined from the plurality of the communication devices according to the multicast connectivity testing result and the cellular mobile communication network allocates radio resources to the group of communication devices for performing virtual ad-hoc network communication. Next, the sending orders for each communication device in the group of communication devices are determined on the basis of the principle that only one communication device is allowed to use the radio resources to send data at a time. Finally, the communication devices are arranged to transfer data in the determined sending orders via the point-to-point direct links between them by utilizing the same radio resources. The object of the above-described solution disclosed in WO2006136992 is to implement a system that is able to provide an ad-hoc multicast network for applications similar to real-time communication between multiple persons. There is, however, a need for further development for connecting an ad-hoc communication network to a permanent communication network in a situation in which a communication link between the permanent communication network and the ac-hoc communication network is a half-duplex communication link and the ad-hoc communication network can be either a full-duplex or half-duplex communication network.

SUMMARY

In accordance with a first aspect of the invention, there is provided a new arrangement for connecting an ad-hoc communication network to a permanent communication network via a half-duplex communication link. The arrangement comprises:

a communication device that includes a processor unit arranged to run a routing protocol for including the communication device into the ad-hoc communication network, and a gateway device that includes a processor unit arranged to run the routing protocol for including the gateway device into the ad-hoc communication network, the gateway device being capable of relaying data from the ad-hoc communication network to the permanent communication network via the half-duplex communication link and relaying data from the permanent communication network to the ad-hoc communication network via the half-duplex communication link, wherein the processor unit of the gateway device is arranged to set the following operations into a pre-determined order of mutual priority: relaying data from the ad-hoc communication network to the permanent communication network via the half-duplex communication link and relaying data from the permanent communication network to the ad-hoc communication network via the half-duplex communication link.

The pre-determined order of the mutual priority facilitates data transfer via the half-duplex communication link between the permanent communication network and the ad-hoc communication network that can be either a full-duplex network or a half-duplex network.

The routing protocol can be, for example, an IP-unicast routing protocol or an IP-multicast routing protocol (Internet Protocol). The permanent half-duplex communication network can be, for example, a half-duplex mobile communication network or a half-duplex landline network.

The relaying of data between the ad-hoc communication network and the permanent communication network can be relaying of protocol data units, e.g. IP-packets, as such if both the permanent communication network and the ad-hoc communication network are able to support the protocol data units, or the relaying of the data can comprise converting the data to a format which is supported by a receiving communication network, e.g. digital-to-analog conversion or analog-to-digital conversion and/or digital encryption to a digital PCM-format (Pulse Coded Modulation). In other words, the relaying of the data may comprise conversion of the format of the data.

The communication device comprises preferably a circuitry that is arranged to create data to be transmitted. The said circuitry can comprise, for example, an acoustical transducer (e.g. a microphone), an analog-to-digital converter, an encoder, and a framer unit arranged to packetize a digital data stream into successive protocol data units. The circuitry may further comprise e.g. a speaker element, a decoder, a modem, a telemetry data interface, a streaming video interface, and/or an encryption/decryption means. The physical implementation can comprise e.g. an external headset or another audio interface that allows handsfree operation for a user of the communication device.

In accordance with a second aspect of the invention, there is provided a new gateway device. The gateway device comprises a processor unit that arranged to run a routing protocol for including the gateway device into an ad-hoc communication network. The gateway device is capable of relaying, via a half-duplex communication link, data from the ad-hoc communication network to a permanent communication network and relaying, via the half-duplex communication link, data from the permanent communication network to the ad-hoc communication network. The processor unit is arranged to set the following operations into a pre-determined order of mutual priority: relaying data from the ad-hoc communication network to the permanent communication network via the half-duplex communication link and relaying data from the permanent communication network to the ad-hoc communication network via the half-duplex communication link.

A gateway device according to an embodiment of the invention may further comprise an audio interface for enabling communication via the ad-hoc communication network and/or via the permanent communication network.

In accordance with a third aspect of the invention, there is provided a new method for connecting an ad-hoc communication network to a permanent communication network via a half-duplex communication link. The method comprises:
   running a routing protocol in a communication device for including the communication device into the ad-hoc communication network, and
   running a routing protocol in a gateway device for including the gateway device into the ad-hoc communication network, the gateway device being capable of relaying data from the ad-hoc communication network to the permanent communication network via the half-duplex communication link and relaying data from the permanent communication network to the ad-hoc communication network via the half-duplex communication link,
   setting the following operations into a pre-determined order of mutual priority: relaying data from the ad-hoc communication network to the permanent communication network via the half-duplex communication link and relaying data from the permanent communication network to the ad-hoc communication network via the half-duplex communication link.

A benefit provided by embodiments of the present invention when compared with prior art solutions of the kind described above is that the pre-determined order of the priority facilitates data transfer via a half-duplex communication link between the permanent communication network and the ad-hoc communication network that can be either a full-duplex network or a half-duplex network.

Various embodiments of the invention both as to constructions and to methods of operation, together with additional objects and advantages thereof, will be best understood from the following description of specific embodiments when read in connection with the accompanying drawings.

The embodiments of the invention presented in this document are not to be interpreted to pose limitations to the applicability of the appended claims. The verb "to comprise" is used in this document as an open limitation that does not exclude the existence of also unrecited features. The features recited in depending claims are mutually freely combinable unless otherwise explicitly stated.

BRIEF DESCRIPTION OF THE FIGURES

Embodiments of the invention presented in the sense of examples and their advantages are explained in greater detail below with reference to the accompanying drawings, in which.

DESCRIPTION OF THE EMBODIMENTS

Figure 1:
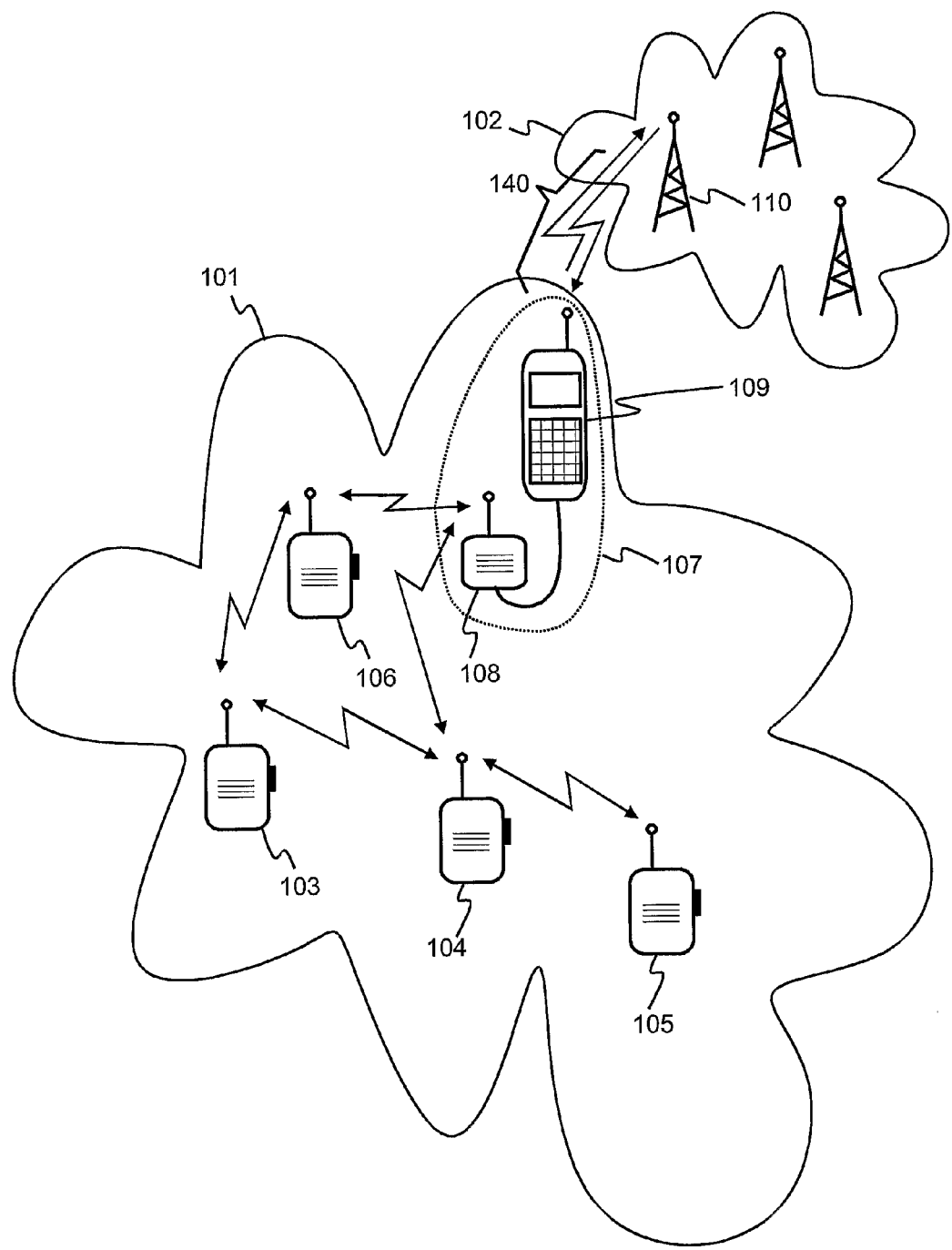
FIG. 1 shows a high-level diagram of an arrangement according to an embodiment of the invention for connecting an ad-hoc communication network to a permanent communication network via a half-duplex communication link.

FIG. 1 shows a high-level diagram of an arrangement according to an embodiment of the invention for connecting an ad-hoc communication network 101 to a permanent communication network 102 via a half duplex communication link 140. The permanent communication network can be, for example, a mobile communication network, a landline network, or a combination of them. In the exemplifying case shown in FIG. 1, the half-duplex communication link 140 is a half-duplex radio link, but the half duplex communication link could also be a half duplex communication link over a copper cable or a half duplex communication link over an optical fiber. The arrangement comprises communication devices 103-106 and a gateway device 107. The gateway device can be in a half-duplex transmission mode or in a half-duplex listening mode with respect to the permanent communication network. In the half-duplex transmission mode the gateway device is enabled to transmit data to the permanent communication network via the half-duplex communication link 140 and in the half-duplex listening mode the gateway device is enabled to receive data from the permanent communication network via the half-duplex communication link.

Each communication device 103-106 comprises a processor unit that is arranged to run a routing protocol for including the communication device into the ad-hoc communication network 101. The gateway device 107 comprises a processor unit that is arranged to run the routing protocol for including the gateway device into the ad-hoc communication network. The ad-hoc communication network can be either a full-duplex communication network or a half-duplex communication network. The routing protocol can be a unicast routing protocol or a multicast routing protocol. A unicast routing protocol can be e.g. an IP-unicast routing protocol. Correspondingly, a multicast routing protocol can be e.g. an IP-multicast routing protocol. For example, RIP (Routing Information Protocol), OSPF-protocol (Open Shortest Path First), IGMP (Internet Group management Protocol), and PIM-SM (Protocol Independent Multicast—Sparse Mode) can be used for controlling unicast and/or multicast operations performed in the communication devices 103-106 and in the gateway device 107.

The gateway device comprises radio receiver that is arranged to receive data from the ad-hoc communication network and a radio receiver that is arranged to receive data from the permanent communication network via the half-duplex radio link 140. The gateway device comprises a radio transmitter that is arranged to transmit data to the ad-hoc communication network and a radio transmitter that is arranged to transmit data to the permanent communication network 102 via the half-duplex radio link 140. In the arrangement shown in FIG. 1 the gateway device is connected via the half duplex radio link 140 to a base station 110 of a mobile communication network. The processor unit of the gateway device is arranged to set the following operations into a pre-determined order of mutual priority: relaying data from the ad-hoc communication network 101 to the permanent communication network 102 and relaying data from the permanent communication network 102 to the ad-hoc communication network 101. The relaying of data may comprise conversion of the format of the data.

In an arrangement according to an embodiment of the invention the gateway device 107 is adapted to dynamically change, on the basis of a pre-determined rule, the order of the mutual priority of the relaying data from the ad-hoc communication network to the permanent communication network and the relaying data from the permanent communication network to the ad-hoc communication network.

The relaying of data from the permanent communication network 102 to the ad-hoc communication network 101 can be given a better priority with respect to the relaying of data from the ad-hoc communication network 101 to the permanent communication network 102 for example in such a way that the processor unit of the gateway device is arranged:

to switch the gateway device into the half-duplex listening mode with respect to the permanent communication network as a response to a situation in which the gateway device receives data from the permanent communication network, to keep the gateway device in the half-duplex listening mode with respect to the permanent communication network as long as the gateway device receives data from the permanent communication network in spite of the fact that the gateway device may simultaneously receive data also from the ad-hoc communication network, and to switch the gateway device into the half-duplex transmission mode with respect to the permanent communication network as a response to a situation in which the gateway device receives data only from the ad-hoc communication network.

The relaying of data from the ad-hoc communication network 101 to the permanent communication network 102 can be given a better priority with respect to the relaying of data from the permanent communication network 102 to the ad-hoc communication network 101 for example in such a way that the processor unit of the gateway device is arranged:

to switch the gateway device into the half-duplex transmission mode with respect to the permanent communication network as a response to a situation in which the gateway device receives data from the ad-hoc communication network, to keep the gateway device in the half-duplex transmission mode with respect to the permanent communication network as long as the gateway device receives data from the ad-hoc communication network in spite of the fact that the gateway device may simultaneously receive data also from the permanent communication network, and to switch the gateway device into the half-duplex listening mode with respect to the permanent communication network as a response to a situation in which the gateway device receives data only from the permanent communication network.

In an arrangement according to an embodiment of the invention the gateway device 107 is arranged to send to the ad-hoc communication network an indicator of channel unavailability as a response to a situation in which the gateway device receives data from the ad-hoc communication network and the gateway device is in the half-duplex listening mode with respect to the permanent communication network. On the basis of the indicator of channel unavailability a user of a communication device 103-106 is able to know that, for the moment, it is not possible to transmit data to the permanent communication network. The gateway device 107 can be further arranged:

to store an indicator of an attempted transmission into a buffer memory as a response to the situation in which the gateway device receives data from the ad-hoc communication network and the gateway device is in the half-duplex listening mode with respect to the permanent communication network, and to send to the ad-hoc communication network an indicator of channel availability as a response to a situation in which the buffer memory contains the indicator of the attempted transmission and the gateway device is switched from the half-duplex listening mode to the half-duplex transmission mode with respect to the permanent communication network.

On the basis of the indicator of channel availability a user of a communication device 103-106 is able to know that it is again possible to transmit data to the permanent communication network.

The gateway device can be further arranged to set channel access priorities for communication devices trying to access the permanent communication network. The channel access priorities can be set e.g. based on the temporal order of requests for channel access (first in, first out) or the channel access priorities can be defined as per communication device or the channel access priorities can be given to the communication devices by casting lots. Temporally successive indicators of channel availability are sent to users of different communication devices in a temporal order determined by the channel access priorities of the respective communication devices.

In an arrangement according to an embodiment of the invention the gateway device 107 is arranged to buffer data that is received from the ad-hoc communication network and addressed to the permanent communication network as a response to a situation in which the gateway device is in the half-duplex listening mode with respect to the permanent communication network while receiving said data. The gateway device is preferably arranged to transmit the buffered data to the permanent communication network after the gateway device has been switched to the half-duplex transmission mode with respect to the permanent communication network.

In an arrangement according to an embodiment of the invention the gateway device 107 is arranged to relay data from the ac-hoc communication network to the permanent communication network as a response to a situation in which said data is carried in a protocol data unit, e.g. an IP-packet, an ATM-cell, an Ethernet frame, or a Frame relay frame, that is provided with a pre-determined protocol address, e.g. with a pre-determined IP-destination or -multicast address (ATM=Asynchronous Transfer Mode). A communication device 103, 104, 105, or 106 comprises a control interface arranged to receive a pre-determined control action and a processor unit arranged to provide the protocol data unit with the pre-determined protocol address as a response to the pre-determined control action, and otherwise, to provide the protocol data unit with another protocol address. Therefore, a user of the communication device can determine with the aid of the above-mentioned pre-determined control action whether he is communicating only inside the ad-hoc communication network 101 or via the permanent communication network 102. The control interface of a communication device 103, 104, 105, or 106 may comprise a push button and pressing of the push button can represent the pre-determined control action. It is also possible that the control interface comprises a speech detector and a first pre-determined voice command represents a beginning of the pre-determined control action and a second pre-determined voice command represents an end of the pre-determined control action. The first pre-determined voice command can be e.g. pronouncing the phrase: "START OUTSIDE" and second pre-determined voice command can be e.g. pronouncing the phrase: "END OUTSIDE".

In an arrangement according to an embodiment of the invention, the routing protocol that is used for controlling the ad-hoc communication network 101 is a multicast routing protocol and the pre-determined protocol address that is used for relaying data from the ad-hoc communication network to the permanent communication network is a first multicast address. The communication devices 103-106 are configured to be destinations for those protocol data units that are provided with a second multicast address and the gateway device 107 is configured to be a destination for those protocol data units that are provided with the first multicast address. In this case, a user of a communication device 103, 104, 105, or 106 transmits data either to users of the other communication devices or to a recipient that can be contacted via the permanent network 110. Protocol data units that carry data received from the permanent communication network are preferably provided with the second multicast address, so the communication devices are configured to be destinations for these protocol data units. The gateway device can be configured to perform a possibly needed protocol conversion between the ad-hoc communication network and the permanent communication network, and to provide the protocol data units that carry data received from the permanent communication network with the second multicast address.

The communication devices 103-106 and the gateway device 107 can be configured to ignore the payload content of those protocol data units that are received in a communication device or in the gateway device but for which the communication device or the gateway device is not configured to be a destination. A communication device or the gateway device can operate as a relaying device that is configured to forward a received protocol data unit to another communication device or to the gateway device irrespective whether or not the communication device or the gateway device that is operating as the relaying device is configured to be a destination of the received protocol data unit. In the exemplifying situation shown in FIG. 1, the gateway device 107 is out of the reach of communication devices 103 and 105. For example, a protocol data unit originated from the communication device 105 can be delivered to the gateway device via the communication device 104.

In an arrangement according to another embodiment of the invention in which the routing protocol is a multicast routing protocol, the communication devices 103-106 are configured to be destinations for those protocol data units that are provided with the second multicast address and both the communication devices 103-106 and the gateway device 107 are configured to be destinations for those protocol data units that are provided with the first multicast address. In this case, a user of a communication device 103, 104, 105, or 106 transmits data either to users of the other communication devices or both to the users of the other communication devices and to a recipient that can be contacted via the permanent network 110. Protocol data units that carry data received from the permanent communication network are preferably provided with the second multicast address, so the communication devices are configured to be destinations for these protocol data units.

In an arrangement according to an embodiment of the invention in which the routing protocol is a multicast routing protocol, the communication devices 103-106 are divided into two groups A and B. The communication devices 103-106 are configured to be destinations for those protocol data units that are provided with the second multicast address. Communication devices belonging to the group A and the gateway device 107 are configured to be destinations for those protocol data units that are provided with the first multicast address. In this case, a user of a communication device 103, 104, 105, or 106 transmits data either to users of the other communication devices 103-106 or to users of other communication devices that belong to the group A and to a recipient that can be contacted via the permanent network 110. Protocol data units that carry data received from the permanent communication network can be provided with the second multicast address or with the first multicast address. The communication devices 103-106 are configured to be destinations for protocol data units that carry data received from the permanent communication network and are provided with the second multicast address. The communication devices belonging to the group A are configured to be destinations for protocol data units that carry data received from the permanent communication network and are provided with the first multicast address. In an arrangement according to an embodiment of the invention the gateway device 107 is arranged to determine, on the basis of data received form the permanent communication network, whether a protocol data unit that carries the above-mentioned data is provided with the first multicast address or with the second multicast address. Therefore, a person who is transmitting data to the ad-hoc communication network through the permanent communication network is able to determine whether the data is delivered to users of all the communication devices 103-106 or only to users of the communication devices belonging to the group A.

Using different multicast addresses it is possible to arrange different multicast groups within the ad-hoc communication network. Different multicast groups can be mutually overlapping or non-overlapping. The control interface of a communication device has to be, however, able to produce as many distinct control indications as there are different multicast addresses in use. When the number of different multicast addresses is two (the first multicast address and the second multicast address) a binary valued control indication is sufficient (a pre-determined control action is effective or it is not effective).

In an arrangement according to an embodiment of the invention the routing protocol is a unicast routing protocol and the predetermined protocol address that is used for relaying data from the ad-hoc communication network to the permanent communication network is an address of the gateway device 107. A communication device 103, 104, 105, or 106 is arranged to send copies of the protocol data unit as successive transmissions to the other communication devices and to the gateway device a response to a pre-determined control action, and otherwise, to transmit the copies of the protocol data unit only to the other communication devices.

In an arrangement according to an embodiment of the invention the routing protocol is a unicast routing protocol and the predetermined protocol address that is used for relaying data from the ad-hoc communication network to the permanent communication network is an address of the gateway device 107. A communication device 103, 104, 105, or 106 is arranged to send copies of the protocol data unit as successive transmissions to those other communication devices that are selected by a user of the transmitting communication device and to the gateway device a response to the pre-determined control action, and otherwise, to transmit the copies of the protocol data unit only to the selected other communication devices. Therefore, the user of the transmitting communication device can communicate, for example, with only one other user of a communication device or only with/via the gateway device depending on the selections made by him/her.

In an arrangement according to an embodiment of the invention both a unicast routing protocol and a multicast routing protocol are used. For example, the multicast routing protocol can be used for controlling communication between the ad-hoc communication network 101 and the permanent communication network 102, and the unicast routing protocol can be used for controlling communication within the ad-hoc communication network 101. The pre-determined protocol address that is used for relaying data from the ad-hoc communication network to the permanent communication network can be a pre-determined multicast address and other protocol addresses that are used can be addresses the communication devices 103-106 and of the gateway device 107.

It should be noted that the above-described principle for connecting the ad-hoc communication network 101 to the permanent communication network 102 can be applied with many different routing schemes and routing protocols and the above-described routing schemes are presented only in the sense of examples.

In an exemplifying arrangement according to an embodiment of the invention the gateway device 107 can comprise an RSM-device (Remote Speaker Microphone) 108 and a mobile phone 109 that are connected to each other. The RSM-device includes the processor unit and the receiver arranged to receive protocol data units from the ad-hoc communication network. The mobile phone includes the transmitter capable of relaying data received from the ad-hoc communication network to the permanent communication network. The RSM-device is connected to the mobile phone through a wired or wireless connection. The communication devices 103-106 and the RSM-device include means for establishing a short range radio link network e.g. WLAN (Wireless Local Area Network) that is used in an ad-hoc mode. The communication devices 103-106 and RSM device 108 form an ad-hoc group. Ad-hoc group parameters can be pre-configured to the communication devices and to the RSM-device or e.g. an RFID-card (Radio Frequency Identification) can be used to exchange the parameters to the to the communication devices and to the RSM-device. Networking parameters may include such multicast/broadcast grouping that all the communication devices and the gateway device can belong to a same network (subnet or channel, multicast group). Basic idea is that the communication devices are communicating to each other through multicast/broadcast i.e. each communication device is configured as a destination to a specific address for any protocol data unit.

In an arrangement according to an embodiment of the invention at least one of the communication devices 103-106 is integrated with a breathing protection apparatus, with a helmet, or with another wearable or handheld apparatus.

Figure 2A:
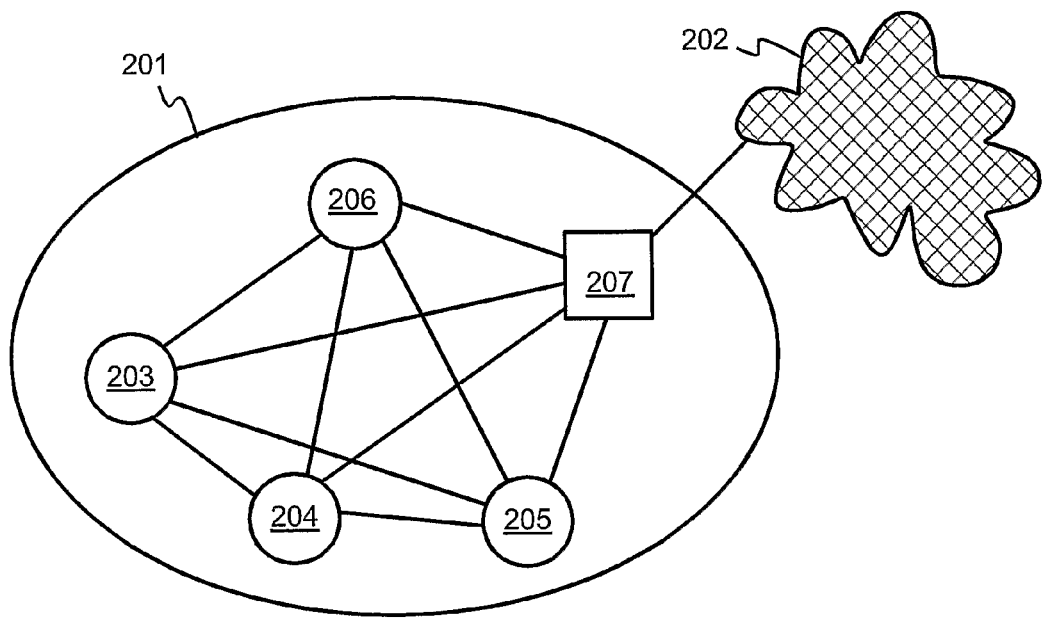
FIGS. 2a and 2b show exemplifying connection topologies in an ad-hoc communication network that can be connected to a permanent communication network with an arrangement according to an embodiment of the invention.
Figure 2B:
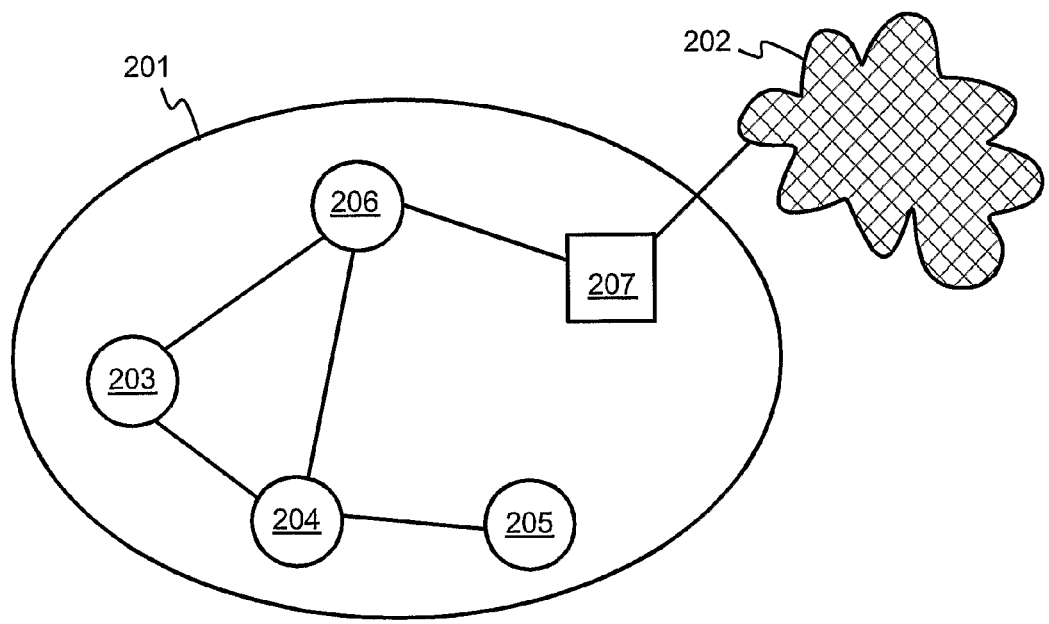

FIGS. 2*a* and 2*b* show exemplifying connection topologies in an ad-hoc communication network that can be connected to a permanent communication network with an arrangement according to an embodiment of the invention. In FIGS. 2*a* and 2*b* circles 203-206 represent communication devices and a square 207 represents the gateway device. The communication devices and the gateway device constitute an ac-hoc communication network 201 that is connected to a permanent network 202 via the gateway device.

In the situation shown in FIG. 2*a*, every communication device 203-206 and the gateway device 207 are within the reach of every other communication device and the gateway device. In other words, there is a full mesh connection topology in the ad-hoc communication network 201. For example if, the communication device 203 transmits a protocol data unit e.g. an IP-packet, all other communication devices 204-206 and the gateway device 207 are able to receive the said protocol data unit. In this case, the routing and forwarding information, e.g. routing and forwarding tables, maintained in the communication devices and in the gateway device indicates that there is no need to transmit a received protocol data unit further from any communication device and from the gateway device.

In the situation shown in FIG. 2*b*, there is no full mesh connection topology in the ad-hoc communication network 201. In this case, the routing and forwarding information maintained in the communication devices and in the gateway device may indicate, for example, that a protocol data unit that is originated by the communication device 206 and is received in the communication device 204 shall be further transmitted from the communication device 204. The connection topology can change dynamically. Known dynamical routing protocols can be used for keeping the routing and forwarding information, e.g. routing and forwarding tables, of the communication devices and the gateway device in touch with changes of the connection topology. Any communication device can relay protocol data units received from a communication device or from the gateway device to other communication devices and to the gateway device depending on the instantaneous connection topology of the ad-hoc communication network. Correspondingly, the gateway device can relay protocol data units received from a communication device to other communication devices. Protocol data units carrying data that is received from the permanent communication network 202 can be treated in the same fashion within the ad-hoc communication network 201.

Figure 3:
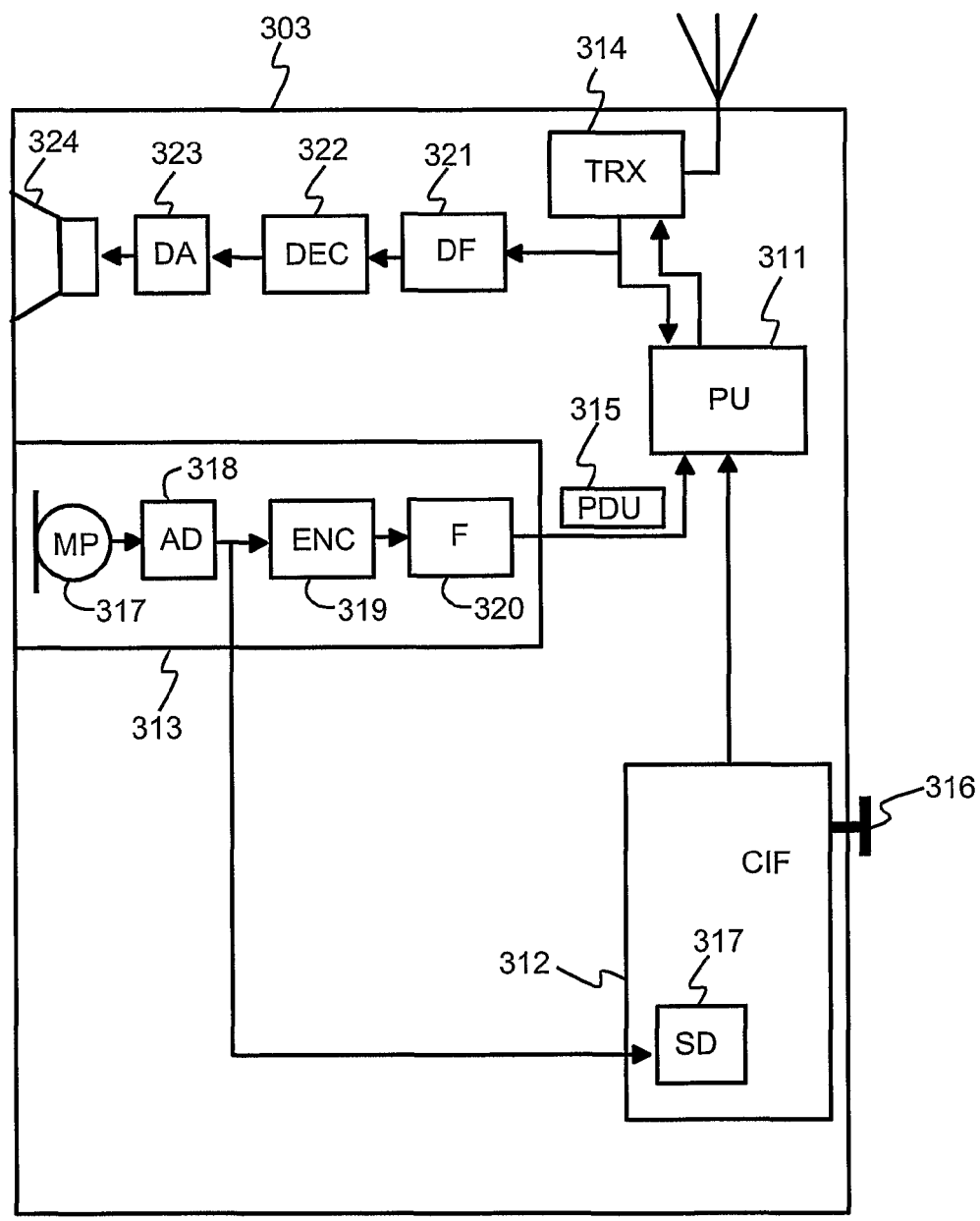
FIG. 3 shows a block diagram of an exemplifying communication device that can be used in an arrangement according to an embodiment of the invention.

FIG. 3 shows a block diagram of an exemplifying communication device 303 that can be used in an arrangement according to an embodiment of the invention. The communication device comprises a processor unit 311 that is arranged to run a routing protocol for including the communication device into an ad-hoc communication network. The communication device comprises a control interface 312 that is arranged to receive a pre-determined control action. The communication device comprises a circuitry 313 that is arranged to create a protocol data unit 315. The circuitry 313 comprises means for converting a voice signal into payloads of successive protocol data units. These means can include a microphone 317, an analog-to-digital converter 318, an encoder 319, and a framer unit 320 arranged to packetize a digital data stream into successive protocol data units. The circuitry 313 can comprise also means for packetizing image, video and/or some other kind of data into successive protocol data units. The protocol data units can be, for example, IP-packets (Internet protocol), Frame relay frames, or Ethernet frames. The communication device comprises a radio transmitter that is arranged to transmit the protocol data unit to the ad-hoc communication network. The radio transmitter is a part of a radio transceiver 314 (transmitter-receiver) that is capable of both transmitting protocol data units to the ad-hoc communication network and receiving protocol data units from the ad-hoc communication network. The processor unit 311 is arranged to provide the protocol data unit 315 with a pre-determined protocol address as a response to the pre-determined control action, and otherwise, to provide the protocol data unit with another protocol address. The communication device can further comprise means for converting data carried by protocol data units into a voice signal. These means can include, for example, a de-framing unit 321 arranged to extract a digital data stream from successive protocol data units, a decoder 322, an digital-to-analog converter 323, and a speaker element 324.

In a communication device according to an embodiment of the invention the control interface 312 comprises a push button 316. Pressing of the push button is arranged to represent the pre-determined control action. Hence, the protocol data unit 315 is provided with the pre-determined protocol address if the push button is pressed. Otherwise the protocol data unit 315 is provided with another protocol address.

In a communication device according to an embodiment of the invention the control interface 312 comprises a speech detector 317. A first pre-determined voice command is arranged to represent a beginning of the pre-determined control action and a second pre-determined voice command is arranged to represent an end of the pre-determined control action. Hence, the protocol data unit 315 is provided with the pre-determined protocol address if the last reception of the first pre-determined voice command has not been followed by a reception of the second pre-determined voice command. Otherwise the protocol data unit 315 is provided with another address.

In a communication device according to an embodiment of the invention the routing protocol is an IP-unicast protocol (Internet Protocol), the protocol data unit is an IP-packet, and an IP-destination address (DA) of the IP-packet is able to carry a value corresponding to the pre-determined protocol address.

In a communication device according to an embodiment of the invention the routing protocol is an IP-multicast protocol (Internet Protocol), the protocol data unit is an IP-packet, and an IP-multicast address (MA) of the IP-packet is able to carry a value corresponding to the pre-determined protocol address.

A communication device according to an embodiment of the invention is arranged to support full-duplex radio communication.

A communication device according to an embodiment of the invention is integrated with a breathing protection apparatus.

A communication device according to an embodiment of the invention is integrated with a helmet.

A communication device according to an embodiment of the invention is integrated with a wearable or handheld device.

Figure 4:
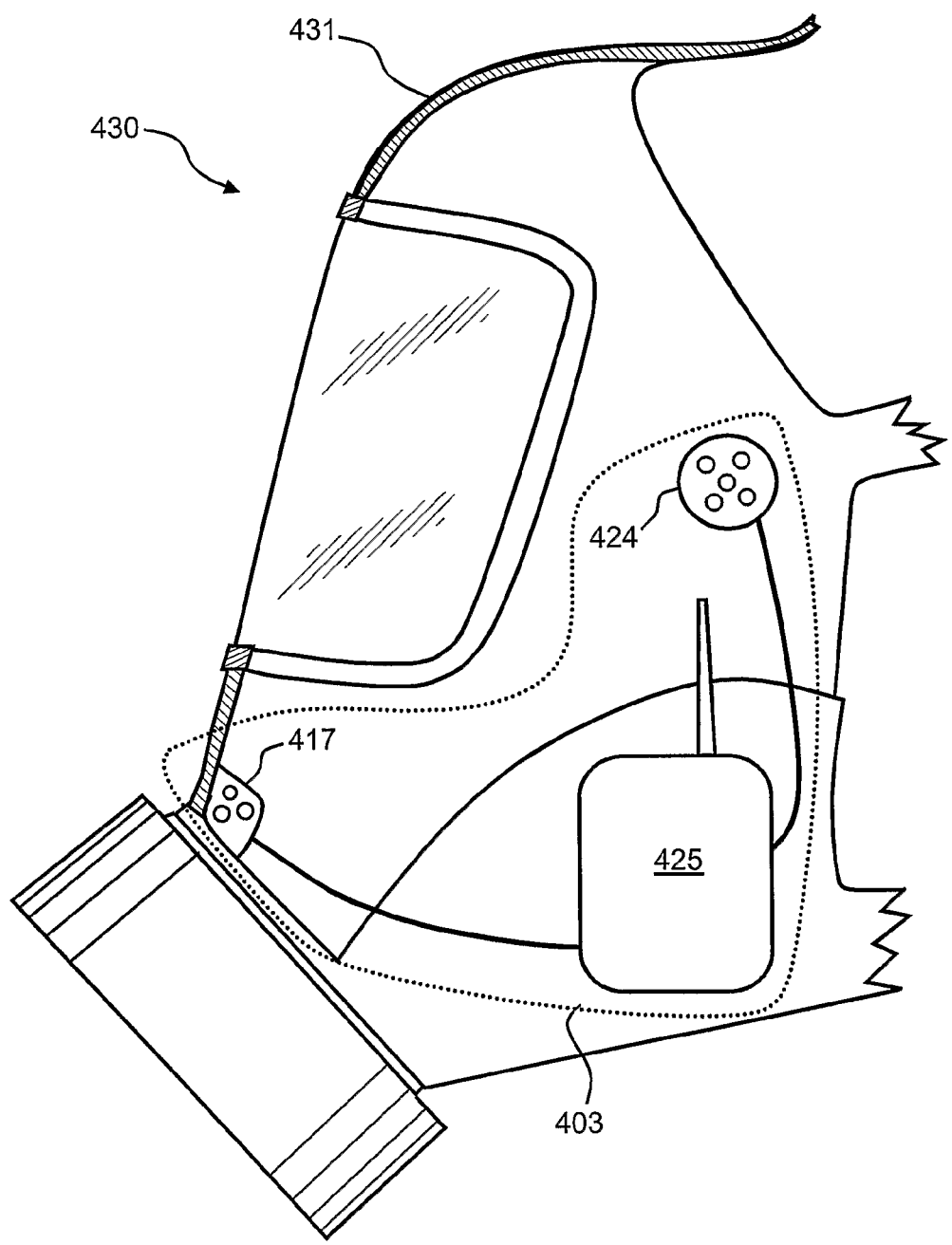
FIG. 4 shows a breathing protection apparatus that can be used in an arrangement according to an embodiment of the invention.

FIG. 4 shows a breathing protection apparatus 430 that can be used in an arrangement according to an embodiment of the invention. The breathing protection apparatus comprises a breathing mask 431 having an eye shield and a filter element that is arranged to filter the air inhaled by a wearer of the breathing protection apparatus. The breathing mask 431 is shown as a partial section view in FIG. 4. The breathing protection apparatus comprises a communication device 403 that includes a microphone 417, an earphone 424, and a communication unit 425. The microphone and the earphone are connected to the communication unit 425 via corded links. The communication unit 425 comprises:

a processor unit arranged to run a routing protocol for including the communication device 403 into an ad-hoc communication network, a control interface arranged to receive a pre-determined control action, a circuitry arranged to create a protocol data unit, and a transmitter arranged to transmit the protocol data unit to the ad-hoc communication network.

The processor unit is arranged to provide the protocol data unit with a pre-determined protocol address as a response to the pre-determined control action and otherwise to provide the protocol data unit with another protocol address. The control interface can comprise, for example, a speech detector that is coupled to the microphone 417. Therefore, a wearer of the breathing protection apparatus can perform the pre-determined control action by using a voice command.

Figure 5:
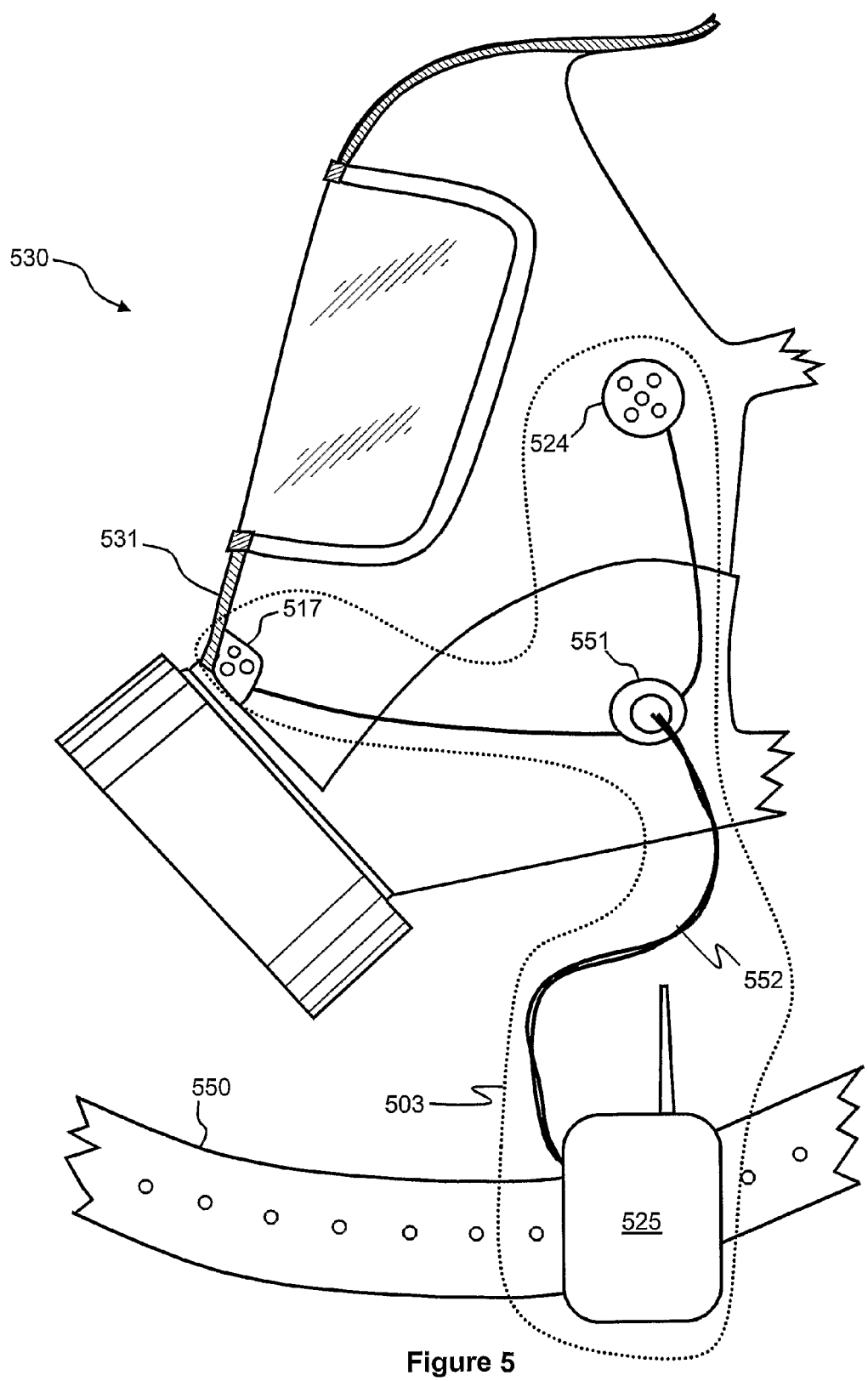
FIG. 5 shows a breathing protection apparatus that can be used in an arrangement according to an embodiment of the invention.

In the breathing protection apparatus shown in FIG. 4 the communication unit 425 is physically integrated with the breathing mask 431. An alternative construction for a breathing protection apparatus 530 is shown in FIG. 5. A communication unit 525 that preferably comprises similar means as the communication unit 425 shown in FIG. 4 is connected to a breathing mask 531 via a corded link 552. The communication unit 525 can be carried, for example, on a belt 550 of a wearer of the breathing protection apparatus 530. The corded link 552 and the breathing mask 531 have electrical connectors 551 that can be connected to each other. The breathing mask 531 comprises a microphone 517 and an earphone 524.

Figure 6A:
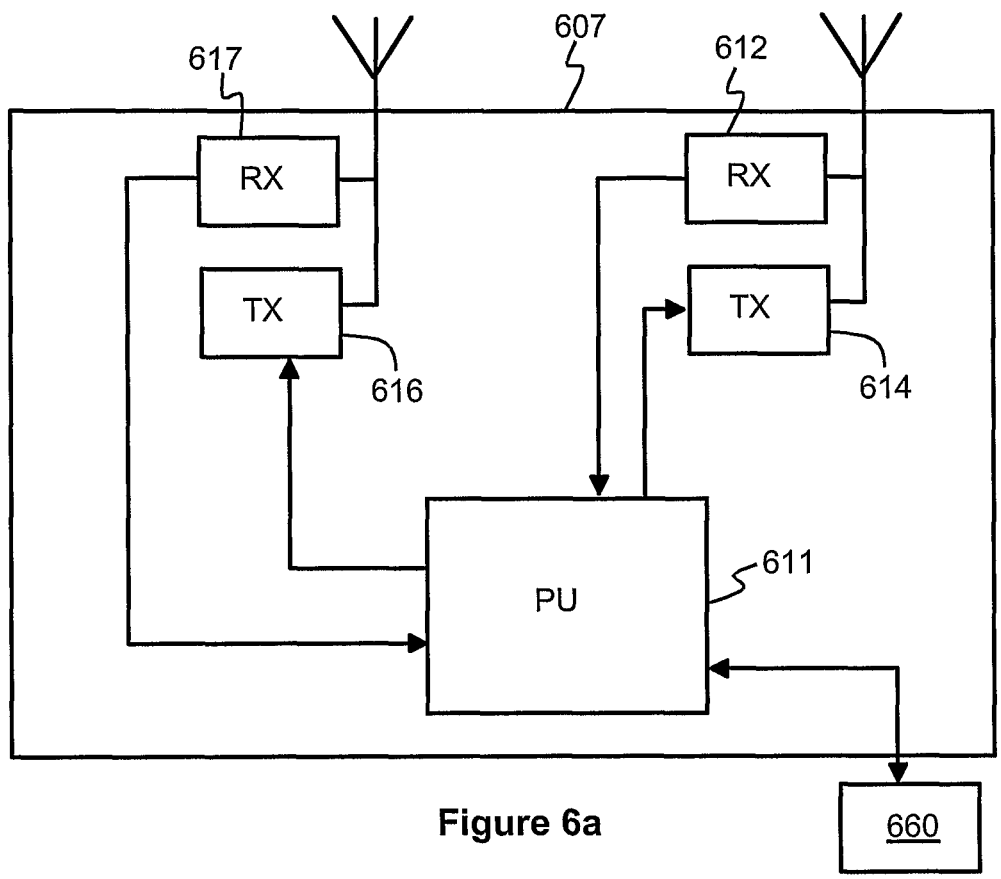
FIG. 6a shows a block diagram of a gateway device according to an embodiment of the invention.

FIG. 6a shows a block diagram of a gateway device 607 according to an embodiment of the invention. The gateway device comprises a processor unit 611 that is arranged to run a routing protocol for including the gateway device into an ad-hoc communication network. The gateway device is capable of relaying, via a half-duplex communication link, data from the ad-hoc communication network to a permanent communication network and relaying data from the permanent communication network to the ad-hoc communication network. The permanent communication network can be e.g. a mobile communication network, a landline network, or a combination of them. The gateway device comprises a receiver 612 that is arranged to receive data from the ad-hoc communication network and a receiver 617 that is arranged to receive data from the permanent communication network via the half-duplex communication link. The gateway device comprises a transmitter 614 that is arranged to transmit data to the ad-hoc communication network and a transmitter 616 that is arranged to transmit data to the permanent communication network via the half-duplex communication link. The processor unit 611 is arranged to set the following operations into a pre-determined order of mutual priority: relaying data from the ad-hoc communication network to the permanent communication network and relaying data from the permanent communication network to the ad-hoc communication network.

In a gateway device according to an embodiment of the invention the processor unit 611 is adapted to dynamically change, on the basis of a pre-determined rule, the order of the mutual priority of the relaying data from the ad-hoc communication network to the permanent communication network and the relaying data from the permanent communication network to the ad-hoc communication network.

In a gateway device according to an embodiment of the invention the processor unit 611 is arranged to send to the ad-hoc communication network an indicator of channel unavailability as a response to a situation in which the gateway device receives data from the ad-hoc communication network and the gateway device is in a half-duplex listening mode with respect to the permanent communication network.

In a gateway device according to an embodiment of the invention the processor unit 611 is arranged to store data received from the ad-hoc communication network into a buffer memory 660 as a response to a situation in which the gateway device is in a half-duplex listening mode with respect to the permanent communication network while receiving said data. The gateway device is preferably arranged to transmit the buffered data to the permanent communication network after the gateway device has been switched to the half-duplex transmission mode with respect to the permanent communication network.

In a gateway device according to an embodiment of the invention the processor unit 611 is arranged:
- to store an indicator of an attempted transmission into the buffer memory 660 as a response to the situation in which the gateway device receives data from the ad-hoc communication network and the gateway device is in a half-duplex listening mode with respect to the permanent communication network, and
- to send to the ad-hoc communication network an indicator of channel availability as a response to a situation in which the buffer memory contains the indicator of the attempted transmission and the gateway device is switched from the half-duplex listening mode to the half-duplex transmission mode with respect to the permanent communication network.

In a gateway device according an embodiment of the invention the processor unit 611 is arranged to set channel access priorities for communication devices of the ad-hoc communication network that are trying to access the permanent communication network. The channel access priorities can be set e.g. based on order of requests for channel access (first in, first out) or the channel access priorities can be defined as per communication device or the channel access priorities can be given to the communication devices by casting lots. Temporally successive indicators of channel availability are sent to users of different communication devices in a temporal order determined by the channel access priorities of the respective communication devices.

The relaying of data from the permanent communication network to the ad-hoc communication network can be given a better priority with respect to the relaying of data from the ad-hoc communication network to the permanent communication network for example in such a way that the processor unit 611 is arranged:
- to switch the gateway device into a half-duplex listening mode with respect to the permanent communication network as a response to a situation in which the gateway device receives data from the permanent communication network,
- to keep the gateway device in the half-duplex listening mode with respect to the permanent communication network as long as the gateway device receives data from the permanent communication network in spite of the fact that the gateway device may simultaneously receive data also from the ad-hoc communication network, and
- to switch the gateway device into a half-duplex transmission mode with respect to the permanent communication network as a response to a situation in which the gateway device receives data only from the ad-hoc communication network.

The relaying of data from the ad-hoc communication network to the permanent communication network can be given a better priority with respect to the relaying of data from the permanent communication network to the ad-hoc communication network for example in such a way that the processor unit 611 is arranged:
- to switch the gateway device into a half-duplex transmission mode with respect to the permanent communication network as a response to a situation in which the gateway device receives data from the ad-hoc communication network,
- to keep the gateway device in the half-duplex transmission mode with respect to the permanent communication network as long as the gateway device receives data from the ad-hoc communication network in spite of the fact that the gateway device may simultaneously receive data also from the permanent communication network, and
- to switch the gateway device into a half-duplex listening mode with respect to the permanent communication network as a response to a situation in which the gateway device receives data only from the permanent communication network.

In a gateway device according to an embodiment of the invention processor unit 611 is arranged to relay data from the ac-hoc communication network to the permanent communication network as a response to a situation in which said data is carried in a protocol data unit that is provided with a pre-determined protocol address.

In a gateway device according to an embodiment of the invention the processor unit 611 is arranged to support an IP-multicast protocol (Internet Protocol) and/or an IP-unicast protocol.

A gateway device according to an embodiment of the invention is arranged to support full-duplex communication within the ad-hoc communication network.

A gateway device according to claim an embodiment of the invention is capable of relaying data to and from at least one of the following permanent communication networks: a mobile communication network and a landline network.

Figure 6B:
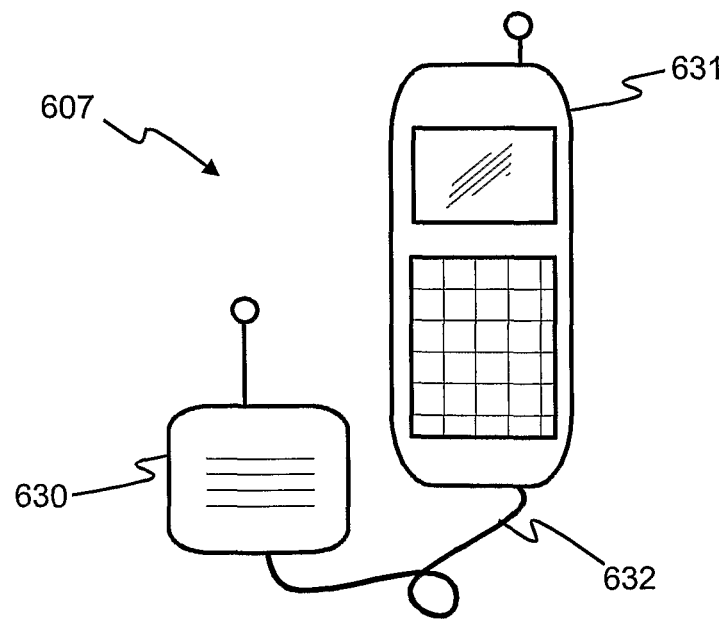
FIG. 6b shows an exemplifying gateway device according to an embodiment of the invention.

FIG. 6b shows an exemplifying gateway device according to an embodiment of the invention. The gateway device comprises an RSM-device 630 (Remote Speaker Microphone) and a mobile phone 631 that are connected to each other. The RSM-device includes the processor unit 611 and the receiver 612. The mobile phone includes the transmitter 616 that is capable of relaying the data carried by the protocol data unit to the permanent communication network. The RSM-device is connected to the mobile phone through a wired or wireless connection.

Figure 7:
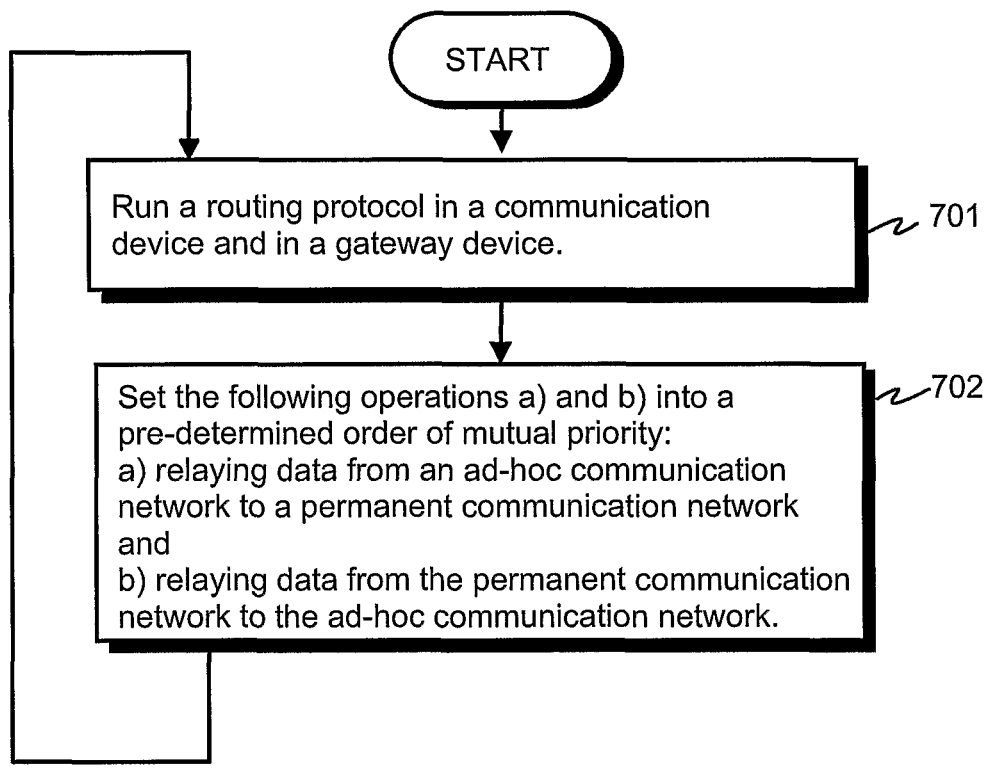
FIG. 7 is a flow chart of a method according to an embodiment of the invention for connecting an ad-hoc communication network to a permanent communication network via a half-duplex communication link.

FIG. 7 is a flow chart of a method according to an embodiment of the invention for connecting an ad-hoc communication network via a half-duplex communication link to a permanent communication network, e.g. a mobile communication network, a landline network, or a combination of them. A phase 701 comprises running a routing protocol in a communication device and in a gateway device for including the communication device and the gateway device into the ad-hoc communication network. The gateway device is capable of relaying data from the ad-hoc communication network to the permanent communication network and relaying data from the permanent communication network to the ad-hoc communication network. A phase 702 comprises setting the following operations a) and b) into a pre-determined order of mutual priority: a) relaying data from the ad-hoc communication network to the permanent communication network and b) relaying data from the permanent communication network to the ad-hoc communication network.

In a method according to an embodiment of the invention, the relaying of data from the permanent communication network to the ad-hoc communication network can be given a better priority with respect to the relaying of data from the ad-hoc communication network to the permanent communication network for example by:

switching the gateway device into a half-duplex listening mode with respect to the permanent communication network as a response to a situation in which the gateway device receives data from the permanent communication network, keeping the gateway device in the half-duplex listening mode with respect to the permanent communication network as long as the gateway device receives data from the permanent communication network in spite of the fact that the gateway device may simultaneously receive data also from the ad-hoc communication network, and switching the gateway device into a half-duplex transmission mode with respect to the permanent communication network as a response to a situation in which the gateway device receives data only from the ad-hoc communication network.

In a method according to an embodiment of the invention, the relaying of data from the ad-hoc communication network to the permanent communication network can be given a better priority with respect to the relaying of data from the permanent communication network to the ad-hoc communication network for example by:

switching the gateway device into the half-duplex transmission mode with respect to the permanent communication network as a response to a situation in which the gateway device receives data from the ad-hoc communication network, keeping the gateway device in the half-duplex transmission mode with respect to the permanent communication network as long as the gateway device receives data from the ad-hoc communication network in spite of the fact that the gateway device may simultaneously receive data also from the permanent communication network, and switching the gateway device into the half-duplex listening mode with respect to the permanent communication network as a response to a situation in which the gateway device receives data only from the permanent communication network.

In a method according to an embodiment of the invention, data received in the gateway device from the ad-hoc communication network and addressed to the permanent communication network is stored into a buffer memory as a response to a situation in which the gateway device is in the half-duplex listening mode with respect to the permanent communication network while receiving the said data. The buffered data is preferably transmitted to the permanent communication network after the gateway device has been switched to the half-duplex transmission mode with respect to the permanent communication network.

In a method according to an embodiment of the invention, the relaying of data from the ac-hoc communication network to the permanent communication network takes place as a response to a situation in which the said data is carried in a protocol data unit, e.g. an IP-packet, that is provided with a pre-determined protocol address. The protocol data unit can be provided with the pre-determined protocol address e.g. as a response to a pre-determined control action received by the communication device, and otherwise, the protocol data unit can be provided with another protocol address.

In a method according to an embodiment of the invention, a transmitter of a mobile phone is used for relaying data from the ad-hoc communication network to the permanent communication network.

In a method according to an embodiment of the invention, the communication device is integrated with a breathing protection apparatus, a helmet, or another wearable or handheld apparatus.

In a method according to an embodiment of the invention an IP-multicast protocol and/or an IP-unicast protocol (Internet Protocol) is/are used as the routing protocol.

In a method according to an embodiment of the invention the ad-hoc communication network is a full-duplex communication network.

Figure 8:
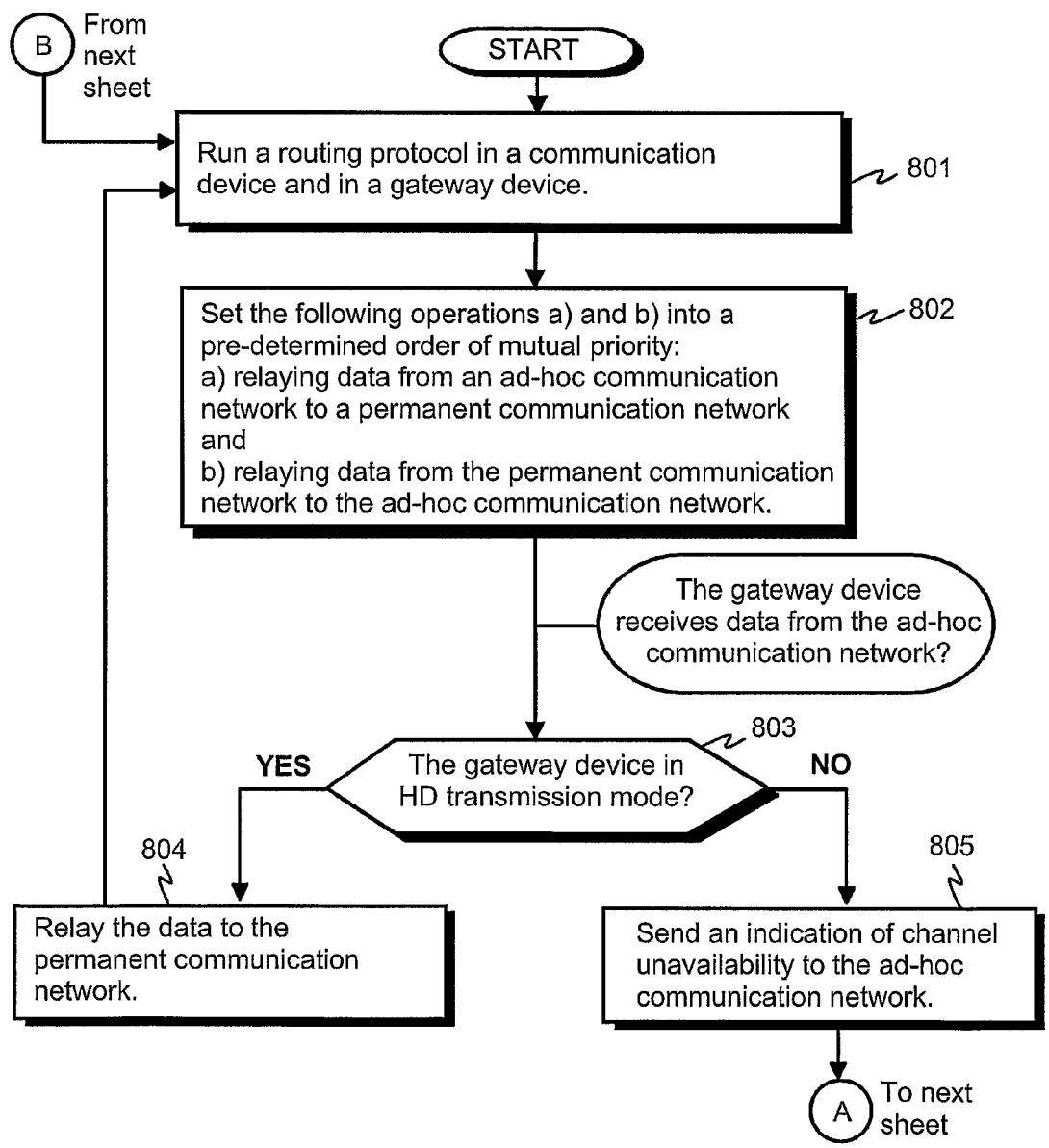
FIG. 8 is a flow chart of a method according to an embodiment of the invention for connecting an ad-hoc communication network to a permanent communication network via a half-duplex communication link.
Figure 8:
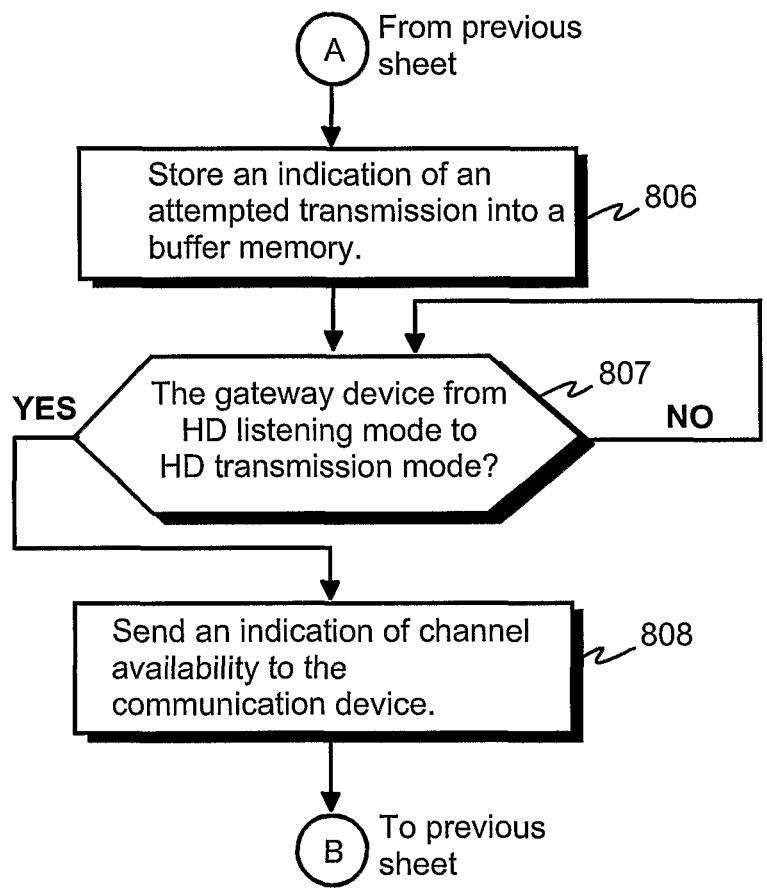

In a method according to an embodiment of the invention the permanent communication network comprises at least one of the following: a mobile communication network and a landline network FIG. 8 is a flow chart of a method according to an embodiment of the invention for connecting an ad-hoc communication network to a permanent communication network via a half-duplex communication link. A phase 801 comprises running a routing protocol in a communication device and in a gateway device for including the communication device and the gateway device into the ad-hoc communication network. A phase 802 comprises setting the following operations a) and b) into a pre-determined order of mutual priority: a) relaying data from the ad-hoc communication network to the permanent communication network and b) relaying data from the permanent communication network to the ad-hoc communication network. If the gateway device is in the half-duplex transmission mode with respect to the permanent communication network (a YES-branch of a decision block 803), data received in the gateway device and addressed to the permanent communication network is relayed to the permanent communication network, a phase 804. If the gateway device is in the half-duplex listening mode with respect to the permanent communication network (a NO-branch of the decision block 803), an indicator of channel unavailability is sent from the gateway device to the ad-hoc communication network, a phase 805. In a phase 806, an indication of an attempted transmission is stored in a buffer memory. With the aid of the indicator of an attempted message it is possible to send a notification (an indicator of channel availability) to the ad-hoc communication network after the gateway device has been switched from the half-duplex listening mode to the half-duplex transmission mode. On the basis of the channel availability indicator a user of the communication device is able to know that it is again possible to transmit data to the permanent communication network. In a selection phase 807 it is checked whether the gateway device is switched from the half-duplex listening mode to the half-duplex transmission mode. If the gateway device is switched from the half-duplex listening mode to the half-duplex transmission mode (the YES-branch), the indicator of channel availability is sent to the communication device, a phase 808.

Temporally successive indicators of channel availability that are related to temporally successive changes from the half-duplex listening mode to the half-duplex transmission mode can be sent to users of different communication devices of the ad-hoc communication network according to the FIFO-discipline (First In—First Out). In other words, a user that has made an earlier attempt to transmit data to the permanent communication network will receive an earlier indicator of channel availability than a user that has made a later attempt to transmit data to the permanent communication network.

In a method according to an embodiment of the invention the temporally successive indicators of channel availability are sent to users of different communication devices in a temporal order determined by channel access priorities of the communication devices, the channel access priorities being based on a pre-determined rule or procedure. The channel access priorities can be based, for example, on types of the communication devices and/or on profiles of the users of the communication devices or the channel access priorities can be given to the communication devices by casting lots. The pre-determined rule or procedure according to which the channel access priorities are determined can be dynamically altered e.g. in a case-by-case manner.

While there have been shown and described and pointed out fundamental novel features of the invention as applied to embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. The specific examples provided in the description given above should not be construed as limiting. Therefore, the invention is not limited merely to the embodiments described above, many variants being possible without departing from the scope of the inventive idea defined in the independent claims.

What is claimed is:

1. A system for connecting an ad-hoc communication network to a permanent communication network via a half-duplex communication link, the system comprising:
    a communication device that includes a processor unit for running a routing protocol for including the communication device into the ad-hoc communication network, and
    a gateway device that includes a processor unit for running the routing protocol for including the gateway device into the ad-hoc communication network, the gateway device being capable of relaying data from the ad-hoc communication network to the permanent communication network via the half-duplex communication link and relaying data from the permanent communication network to the ad-hoc communication network via the half-duplex communication link,
        wherein the processor unit of the gateway device is configured to be suitable for selecting between:
    prioritizing relaying data from the ad-hoc communication network to the permanent communication network via the half-duplex communication link over relaying data from the permanent communication network to the ad-hoc communication network via the half-duplex communication link; and
    prioritizing relaying data from the permanent communication network to the ad-hoc communication network via the half-duplex communication link over relaying data from the ad-hoc communication network to the permanent communication network via the half-duplex communication link.

2. The system according to claim 1, wherein the gateway device comprises a circuitry for sending to the ad-hoc communication network an indicator of channel unavailability as a response to a situation in which the gateway device receives data from the ad-hoc communication network and the gateway device is in a half-duplex listening mode with respect to the permanent communication network.

3. The system according to claim 1, wherein the gateway device comprises a circuitry for buffering data received from the ad-hoc communication network as a response to a situation in which the gateway device is in a half-duplex listening mode with respect to the permanent communication network while receiving said data.

4. The system according to claim 1, wherein the gateway device comprises a circuitry for:
    storing an indicator of an attempted transmission into a buffer memory as a response to the situation in which the gateway device receives data from the ad-hoc communication network and the gateway device is in a half-duplex listening mode with respect to the permanent communication network, and
    sending to the ad-hoc communication network an indicator of channel availability as a response to a situation in which the buffer memory contains the indicator of the attempted transmission and the gateway device is switched from the half-duplex listening mode to a half-duplex transmission mode with respect to the permanent communication network.

5. The system according to claim 1, wherein the processor unit of the gateway device is configured to be suitable for:
    switching the gateway device into a half-duplex listening mode with respect to the permanent communication network as a response to a situation in which the gateway device receives data from the permanent communication network,
    keeping the gateway device in the half-duplex listening mode with respect to the permanent communication network as long as the gateway device receives data from the permanent communication network in spite of the fact that the gateway device is capable of simultaneously receiving data also from the ad-hoc communication network, and
    switching the gateway device into a half-duplex transmission mode with respect to the permanent communication network as a response to a situation in which the gateway device receives data only from the ad-hoc communication network.

6. The system according to claim 1, wherein the processor unit of the gateway device is configured to be suitable for:
    switching the gateway device into a half-duplex transmission mode with respect to the permanent communication network as a response to a situation in which the gateway device receives data from the ad-hoc communication network,
    keeping the gateway device in the half-duplex transmission mode with respect to the permanent communication network as long as the gateway device receives data from the ad-hoc communication network in spite of the fact that the gateway device is capable of simultaneously receiving data also from the permanent communication network, and switching the gateway device into a half-duplex listening mode with respect to the permanent communication network as a response to a situation in which the gateway device receives data only from the permanent communication network.

7. The system according to claim 1, wherein the gateway device comprises circuitry for relaying data from the ac-hoc communication network to the permanent communication network as a response to a situation in which said data is carried in a protocol data unit that is provided with a pre-determined protocol address.

8. The system according to claim 7, wherein the communication device comprises a control interface for receiving a pre-determined control action and a processor unit for providing the protocol data unit with the pre-determined protocol address as a response to the pre-determined control action, and otherwise, to provide the protocol data unit with another protocol address.

9. The system according to claim 1, wherein the gateway device comprises a mobile phone that includes a transmitter for relaying data to the permanent communication network.

10. The system according to claim 1, wherein the communication device is integrated with one of the following: a breathing protection apparatus, a helmet, and a wearable device.

11. The system according to claim 1, wherein the routing protocol is an IP-multicast protocol (Internet Protocol) and the protocol data unit is an IP-packet.

12. The system according to claim 1, wherein the routing protocol is an IP-unicast protocol (Internet Protocol) and the protocol data unit is an IP-packet.

13. The system according to claim 1, wherein the ad-hoc communication network is a full-duplex communication network.

14. The system according to claim 1, wherein the permanent communication network comprises at least one of the following: a mobile communication network and a landline network.

15. A gateway device comprising a processor unit arranged to run a routing protocol for including the gateway device into an ad-hoc communication network, the gateway device being capable of relaying, via a half-duplex communication link, data from the ad-hoc communication network to a permanent communication network and relaying, via the half-duplex communication link, data from the permanent communication network to the ad-hoc communication network, wherein the processor unit is arranged to select between:

prioritizing relaying data from the ad-hoc communication network to the permanent communication network via the half-duplex communication link over relaying data from the permanent communication network to the ad-hoc communication network via the half-duplex communication link; and prioritizing relaying data from the permanent communication network to the ad-hoc communication network via the half-duplex communication link over relaying data from the ad-hoc communication network to the permanent communication network via the half-duplex communication link.

16. The gateway device according to claim 15, wherein the processor unit is arranged to send to the ad-hoc communication network an indicator of channel unavailability as a response to a situation in which the gateway device receives data from the ad-hoc communication network and the gateway device is in a half-duplex listening mode with respect to the permanent communication network.

17. The gateway device according to claim 15, wherein the processor unit is arranged to store data received from the ad-hoc communication network into a buffer memory as a response to a situation in which the gateway device is in a half-duplex listening mode with respect to the permanent communication network while receiving said data.

18. The gateway device according to claim 15, wherein the processor unit is arranged:

to store an indicator of an attempted transmission into a buffer memory as a response to the situation in which the gateway device receives data from the ad-hoc communication network and the gateway device is in a half-duplex listening mode with respect to the permanent communication network, and to send to the ad-hoc communication network an indicator of channel availability as a response to a situation in which the buffer memory contains the indicator of the attempted transmission and the gateway device is switched from the half-duplex listening mode to the half-duplex transmission mode with respect to the permanent communication network.

19. The gateway device according to claim 15, wherein the processor unit is arranged:

to switch the gateway device into a half-duplex listening mode with respect to the permanent communication network as a response to a situation in which the gateway device receives data from the permanent communication network, to keep the gateway device in the half-duplex listening mode with respect to the permanent communication network as long as the gateway device receives data from the permanent communication network in spite of the fact that the gateway device is capable of simultaneously receiving data also from the ad-hoc communication network, and to switch the gateway device into a half-duplex transmission mode with respect to the permanent communication network as a response to a situation in which the gateway device receives data only from the ad-hoc communication network.

20. The gateway device according to claim 15, wherein the processor unit is arranged:

to switch the gateway device into a half-duplex transmission mode with respect to the permanent communication network as a response to a situation in which the gateway device receives data from the ad-hoc communication network, to keep the gateway device in the half-duplex transmission mode with respect to the permanent communication network as long as the gateway device receives data from the ad-hoc communication network in spite of the fact that the gateway device is capable of simultaneously receiving data also from the permanent communication network, and to switch the gateway device into a half-duplex listening mode with respect to the permanent communication network as a response to a situation in which the gateway device receives data only from the permanent communication network.

21. The gateway device according to claim 15, wherein processor unit is arranged to relay data from the ac-hoc communication network to the permanent communication network as a response to a situation in which said data is carried in a protocol data unit that is provided with a pre-determined protocol address.

22. The gateway device according to claim 15, wherein the gateway device comprises a mobile phone that includes the transmitter capable of relaying data to the permanent communication network.

23. The gateway device according to claim 15, wherein the routing protocol is an IP-multicast protocol (Internet Protocol) and the protocol data unit is an IP-packet.

24. The gateway device according to claim 15, wherein the routing protocol is an IP-unicast protocol (Internet Protocol) and the protocol data unit is an IP-packet.

25. The gateway device according to claim 15, wherein the gateway device is arranged to support full-duplex communication within the ad-hoc communication network.

26. The gateway device according to claim 15, wherein the gateway device is capable of relaying data to and from at least one of the following permanent communication networks: a mobile communication network and a landline network.

27. A method for connecting an ad-hoc communication network to a permanent communication network via a half-duplex communication link, the method comprising:
running a routing protocol in a communication device for including the communication device into the ad-hoc communication network,
running a routing protocol in a gateway device for including the gateway device into the ad-hoc communication network, the gateway device being capable of relaying data from the ad-hoc communication network to the permanent communication network via the half-duplex communication link and relaying data from the permanent communication network to the ad-hoc communication network via the half-duplex communication link, and
selecting between:
prioritizing relaying data from the ad-hoc communication network to the permanent communication network via the half-duplex communication link over relaying data from the permanent communication network to the ad-hoc communication network via the half-duplex communication link; and
prioritizing relaying data from the permanent communication network to the ad-hoc communication network via the half-duplex communication link over relaying data from the ad-hoc communication network to the permanent communication network via the half-duplex communication link.

28. The method according to claim 27, wherein the method comprises sending from the gateway device to the ad-hoc communication network an indicator of channel unavailability as a response to a situation in which the gateway device receives data from the ad-hoc communication network and the gateway device is in a half-duplex listening mode with respect to the permanent communication network.

29. The method according to claim 27, wherein the method comprises storing data that is received in the gateway device from the ad-hoc communication network as a response to a situation in which the gateway device is in a half-duplex listening mode with respect to the permanent communication network while receiving said data.

30. The method according to claim 27, wherein the method further comprises sending from the gateway device to the ad-hoc communication network an indicator of channel availability as a response to a situation in which the gateway device has received data from the ad-hoc communication network while being in a half-duplex listening mode with respect to the permanent communication network and the gateway device is switched from the half-duplex listening mode to the half-duplex transmission mode with respect to the permanent communication network.

31. The method according to claim 27, wherein the method comprises:
switching the gateway device into a half-duplex listening mode with respect to the permanent communication network as a response to a situation in which the gateway device receives data from the permanent communication network,
keeping the gateway device in the half-duplex listening mode with respect to the permanent communication network as long as the gateway device receives data from the permanent communication network in spite of the fact that the gateway device is capable of simultaneously receiving data also from the ad-hoc communication network, and
switching the gateway device into a half-duplex transmission mode with respect to the permanent communication network as a response to a situation in which the gateway device receives data only from the ad-hoc communication network.

32. The method according to claim 27, wherein the method comprises:
switching the gateway device into a half-duplex transmission mode with respect to the permanent communication network as a response to a situation in which the gateway device receives data from the ad-hoc communication network,
keeping the gateway device in the half-duplex transmission mode with respect to the permanent communication network as long as the gateway device receives data from the ad-hoc communication network in spite of the fact that the gateway device is capable of simultaneously receiving data also from the permanent communication network, and
switching the gateway device into a half-duplex listening mode with respect to the permanent communication network as a response to a situation in which the gateway device receives data only from the permanent communication network.

33. The method according to claim 27, wherein the relaying data from the ac-hoc communication network to the permanent communication network takes place as a response to a situation in which said data is carried in a protocol data unit that is provided with a pre-determined protocol address.

34. The method according to claim 33, wherein the protocol data unit is provided with the pre-determined protocol address as a response to a pre-determined control action received by the communication device, and otherwise, the protocol data unit is provided with another protocol address.

35. The method according to claim 27, wherein a transmitter of a mobile phone is used for relaying data from the ad-hoc communication network to the permanent communication network.

36. The method according to claim 27, wherein the communication device is integrated with one of the following: a breathing protection apparatus, a helmet, and a wearable device.

37. The method according to claim 27, wherein an IP-multicast protocol (Internet Protocol) is used as the routing protocol and the protocol data unit is an IP-packet.

38. The method according to claim 27, wherein an IP-unicast protocol (Internet Protocol) is used as the routing protocol and the protocol data unit is an IP-packet.

39. The method according to claim 27, wherein the ad-hoc communication network is a full-duplex communication network.

40. The method according to claim 27, wherein the permanent communication network comprises at least one of the following: a mobile communication network and a landline network.

* * * * *

UNITED STATES PATENT AND TRADEMARK OFFICE
CERTIFICATE OF CORRECTION

PATENT NO.       : 8,699,432 B2
APPLICATION NO. : 12/863447
DATED            : April 15, 2014
INVENTOR(S)      : Sinivaara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 395 days.

Signed and Sealed this

Twenty-ninth Day of September, 2015

Michelle K. Lee
*Director of the United States Patent and Trademark Office*